R. WINTZER.
ENGINE VALVE.
APPLICATION FILED MAY 24, 1906.
1,021,438.
Patented Mar. 26, 1912.
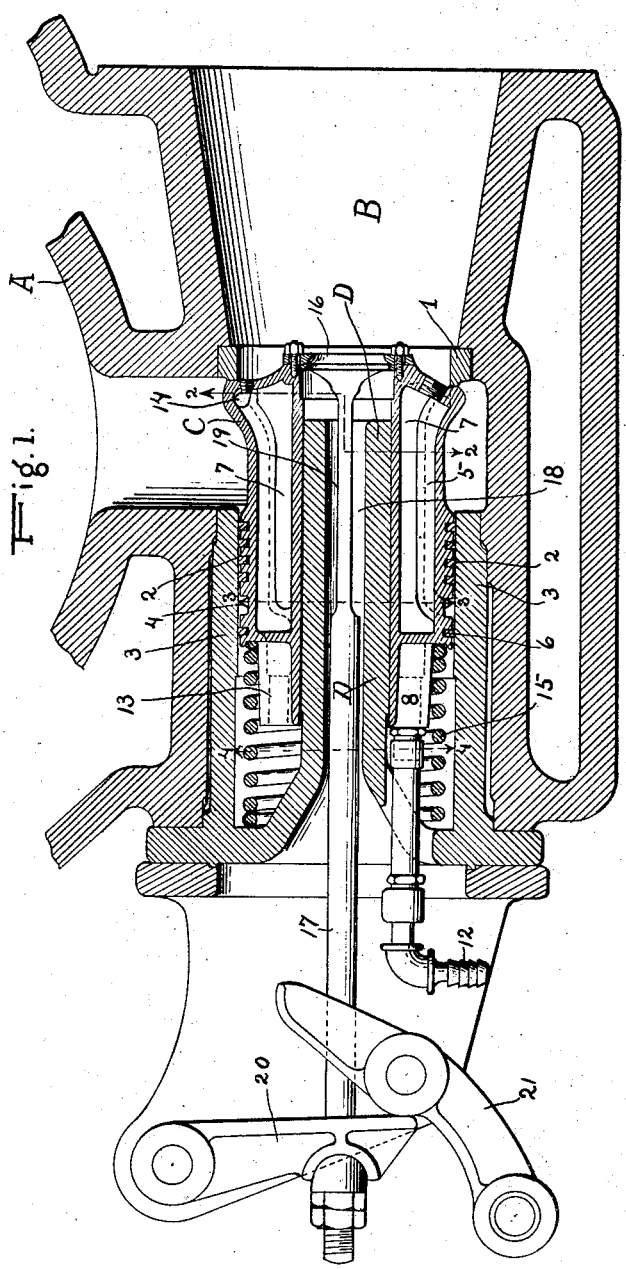
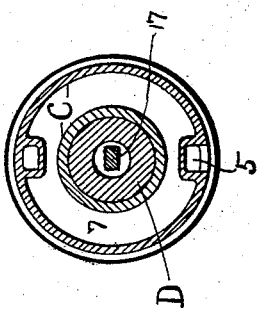
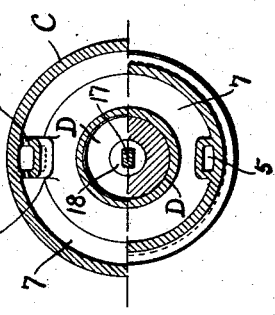
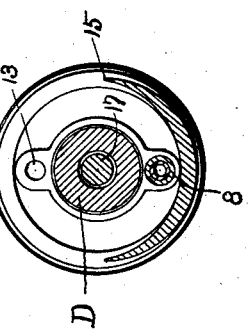
Witnesses
Stuart Hilder.
N. Curtis Lammond
Inventor
Rudolf Wintzer
By H. H. Bliss
His Attorney

UNITED STATES PATENT OFFICE.

RUDOLF WINTZER, OF MILWAUKEE, WISCONSIN, ASSIGNOR TO POWER AND MINING MACHINERY COMPANY, OF NEW YORK, N. Y., A CORPORATION OF NEW JERSEY.

ENGINE-VALVE.

1,021,438.  Specification of Letters Patent.  Patented Mar. 26, 1912.

Application filed May 24, 1906. Serial No. 318,495.

*To all whom it may concern:*

Be it known that I, RUDOLF WINTZER, a subject of the Emperor of Germany, residing at Milwaukee, in the county of Milwaukee and State of Wisconsin, have invented certain new and useful Improvements in Engine-Valves, of which the following is a specification, reference being had therein to the accompanying drawing.
This invention relates to valves and especially to the exhaust valves of internal combustion engines.

The object of the invention is to provide a valve having a minimum amount of material and weight, which shall require small power to operate and which shall be strong and durable.

The invention is illustrated in the accompanying drawings, of which—
Figure 1 is a longitudinal section of a valve and so much of an engine cylinder as is necessary to illustrate the application of the valve thereto. Fig. 2 is a transverse section on the line 2—2 of Fig. 1. Figs. 3 and 4 are cross sectional views taken on the lines 3—3 and 4—4, respectively, of Fig. 1.

Referring to the accompanying drawings, the cylinder, A, of the engine is provided with an exhaust duct, B, controlled by a valve, C, mounted to slide upon a bearing, D, supported by the cylinder.

Referring to the parts in detail, a valve seat, 1, is mounted in the exhaust duct, B. This seat has a flat face for engagement with the valve, as shown. The valve, C, is hollow and within it extends the bearing, D. To prevent the gases from the duct, B, from coming in contact with the bearing for the valve, packing, 2, is interposed between the valve bearing and the duct and in this case the packing is arranged upon the exterior of the valve between it and a wall, 3. The arrangement of the bearing upon the interior of the valve and the packing upon the exterior thereof, enables the construction to be considerably shortened. This wall might be the interior of the valve cavity in the cylinder but in the present instance is shown as separate therefrom and formed integral with the bearing, D. It is possible that some of the gases from the duct might leak by the packing, 2, and eventually find their way to the valve bearing. To prevent this a channel, 4, inclosed by the valve and its adjacent wall, is provided, the said channel being connected with the exhaust duct outside the port by means of an outlet, 5. A packing 6 is interposed between the channel and the valve bearing to confine the gases within the channel until they are discharged through the outlet. It will now be seen that any gases which may find their way by the packing, 2, to the channel will be confined therein by reason of the packing, 2, upon one side and the packing, 6, upon the other. It is a further important result of thus intercepting the exhaust gases that one side of the valve may be exposed to the atmosphere without danger of the gases leaking into the engine room.

Within the valve is formed a chamber, 7, which is separated from the interior surface of the valve, and therefore from the bearing surface, by but a thin partition. This chamber is for the purpose of receiving a cooling fluid, such as water, which may be admitted to the chamber at the bottom by means of a passage, 8, and a connector, 12, adapted to receive a flexible coupling which will permit the valve to move freely. The fluid has its exit through a passage, 13, connected by openings, 14, with the top of the valve chamber. The passage, 13, may be provided with a connector and flexible coupling, as illustrated in connection with the ingress passage.

It is to be observed that the chamber, 7, for the cooling fluid, is substantially coextensive with the valve and forms a cooling jacket between the gases of the exhaust passage and the valve bearing. Moreover the cooling fluid coming into close proximity to the bearing maintains it in a cool condition, thereby facilitating and preserving its lubrication. It is also to be observed that with the arrangement whereby the cooling fluid enters at the lowest point of the valve chamber and is withdrawn from the top thereof, a perfect circulation of water in the valve is secured and the formation of steam or hot water pockets is avoided.

A compression spring, 15, tends to press the valve against its seat and the valve is lifted from its seat by pressure exerted upon the end opposite that upon which the spring bears. This is an important feature for it would be prohibitive to form the valve in any other manner than casting and, as is well known, cast iron or other metal is exceedingly unreliable when placed under tension. Where, therefore, the movement of the valve is effected by placing any of its parts under tension, those parts must be made extremely large and heavy. When, however, as in the present case, the valve is moved by placing the parts under compression, they can be reduced in size to a very considerable extent, thereby reducing the weight and cost of the valve as well as increasing its durability by relieving it of the wear incidental to considerable weight of the parts. In the drawings, the means for creating pressure upon the end of the valve to lift it from its seat, is shown as a plate, 16, secured to the end of the valve and to a rod, 17, of steel or other suitable tension-withstanding material, which extends through a passage, 18, in the bearing, D, and at its outer end is engaged by any suitable means for placing the rod, 17, under tension to lift the valve, which means may be so connected with other portions of the engine as to be operated at the proper times. Both the means and the connections may be of any suitable form, many of which are well known in the art. In order that the rod, 17, may spring slightly in order to conform to variations in alinement of the various bearings of the valve seat, it may be reduced in section at 19, as shown.

It is to be observed that in the construction shown, none of the parts extend into the exhaust passage beyond the valve seat and the retardation of the exhaust gases and back pressure in the cylinder which would thereby be caused are avoided. It is further to be observed that all of the bearing surfaces are protected from contact with the exhaust gases and thereby the destruction of the lubrication and corrosion and deterioration of those surfaces is avoided.

While the invention has been illustrated in what is considered its best application, it may be embodied in other structures without departing from the spirit of the invention. The invention should not, therefore, be limited to the structure shown.

What I claim and desire to secure by Letters Patent, is:

1. The combination with a duct, of a valve in said duct, a bearing for said valve upon the interior thereof and means upon the exterior of said valve for preventing the passage of fluid from the duct to the bearing.

2. The combination with a duct, of a valve, a bearing for the valve extending within the same, a wall exterior to the valve and packing between the exterior of said valve and said wall.

3. The combination with a duct, of a valve in said duct, a bearing for the valve, a wall surrounding said valve, said wall and valve inclosing a channel located between said bearing and that part of said duct on the intake side of the valve seat, packing between said valve and wall upon each side of said channel and an outlet for said channel opening into that part of the duct on the discharge side of the valve seat.

4. The combination with a duct having a valve cavity, of a valve bearing extending into the cavity and separated from the walls thereof, a valve closure movably mounted within the cavity and on the bearing to encircle it, the said valve closure having a chamber which surrounds the bearing and which is surrounded by the walls of the valve cavity, a valve seat arranged to be engaged by the valve closure to close the duct, and means for supplying a cooling fluid to the chamber in the valve closure.

5. The combination with a duct of a hollow valve therein, an interior bearing projecting within said valve, a chamber for cooling fluid within said valve and encircling said bearing and means for supplying fluid to said chamber and withdrawing it from said chamber in a continuous circulatory passage independent of said duct.

6. The combination with a valve of cast metal, of a seat therefor, an interior hollow bearing projecting within said valve, means bearing upon one end of the valve tending to press the valve against its seat, and an elongated flexible rod connected to the other end of the valve and extending through said hollow bearing and adapted to be connected at its other end to valve operating mechanism, substantially as set forth.

7. The combination with a valve of cast metal of a seat therefor, means bearing upon one end of the valve tending to press the valve against its seat, means parallel to the valve and constructed of tension-withstanding material adapted to engage with the other end of the valve and extending away from the valve in the same direction as does the pressing means and means for placing the last mentioned means under tension to lift the valve from its seat.

8. The combination with a hollow valve of a seat therefor, a bearing for the valve extending within the same, said bearing having a passage, means bearing upon one end of the valve tending to press it against its seat and a rod adapted to be connected to valve operating mechanism extending through the passage in the bearing and adapted to engage with the other end of the valve.

9. The combination with a hollow valve of a seat therefor, a bearing for the valve extending within the same, said bearing having a passage, means bearing upon one end of the valve tending to press it against its seat and a rod having a reduced section extending through the passage in the bearing and adapted to engage with the other end of the valve said rod being made of flexible material and being adapted to be connected to valve operating mechanism.

10. The combination with a hollow valve of a seat therefor, a bearing having a passage entered within the valve, a wall surrounding the valve, means bearing upon one end of the valve tending to press it against its seat, packing between said wall and said valve, a rod for lifting the valve from its seat extending through the passage in the bearing and adapted to engage with the other end of the valve and means for placing the rod under tension.

11. The combination with a valve of cast metal of a seat therefor, means bearing upon one end of the valve tending to press the valve against its seat, means parallel to the valve and constructed of steel adapted to engage with the other end of the valve and extending away from the valve in the same direction as does the pressing means and means for placing the last means under tension to lift the valve from its seat.

12. The combination with a valve of cast metal, of a seat therefor, means for normally pressing said valve against said seat, and means bearing against the end of the valve adjacent the seat and extending away from the seat on the intake side for lifting the said valve from its seat, said valve being supported entirely on the intake side of its seat.

In testimony whereof I affix my signature, in presence of two witnesses.

RUDOLF WINTZER.

Witnesses:
L. F. SNYDER,
F. G. BECKER.